(No Model.)
A. J. L. LORETZ.
WATER REGULATOR AND ACCUMULATOR FOR HOUSE PURPOSES.
No. 357,128. Patented Feb. 1, 1887.
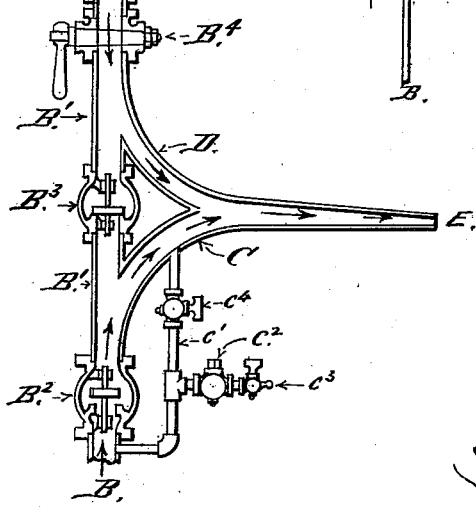

United States Patent Office.

ARTHUR J. L. LORETZ, OF BROOKLYN, NEW YORK.

WATER REGULATOR AND ACCUMULATOR FOR HOUSE PURPOSES.

SPECIFICATION forming part of Letters Patent No. 357,128, dated February 1, 1887.

Application filed August 11, 1886. Serial No. 210,652. (No model.)

*To all whom it may concern:*

Be it known that I, ARTHUR J. L. LORETZ, of Brooklyn, in the county of Kings and State of New York, have invented a Water Regulator and Accumulator for House Purposes, of which the following is a specification.

The object of my invention has been to produce a mechanical contrivance for the purpose of remedying three defects occurring in the ordinary arrangements of the water-supply of houses, which are, first, the water-ram, caused by the sudden closing of stop-cocks or faucets when water is being drawn, thereby causing the bursting of pipes; second, the cutting off of the supply in the upper stories while water is being drawn in the lower parts; third, want of a sufficient supply of water to produce a momentary large current or flow, termed a "wash," in the closets.

By the use of a cylindrical air-tight vessel, of about fifteen gallons capacity for an ordinary dwelling, placed in close proximity to the water-closet in a bath-room on the second floor, and auxiliary line of pipe and certain easy curved pipe-connections, combined with check-valves, I accumulate the power, which would otherwise produce the ram or concussion in the pipes, for the production of a powerful current or wash in the closets, and at times raise water to a higher level for use in the upper stories than the natural pressure of the works supplying would.

In order that those who are skilled in the art may thoroughly understand how to apply my invention, I will now explain the same, referring to Figures 1 and 2.

Fig. 1 is an enlarged view of the accumulator and regulator. A is an air-tight vessel, or what is termed an "air-chamber," provided on top with a T-connection, with a check-valve working inwardly for the purpose of admitting air and retaining pressure inwardly. $A^3$ is an air-cock to admit or blow off air, but is invariably closed when the apparatus is in operation. A' is a bell-mouth shaped bottom to facilitate and increase the incoming and outgoing current, respectively. $B^4$ is an ordinary stop-cock, which is only to be closed in case of a leak in the accumulator. B is the end of the main-supply water-pipe, which comes up to the second floor. E is the main outlet supplying the second and upper floors.

Fig. 2 represents the whole system on the second floor of a dwelling, showing my mode of connecting the pipes with water-closet W, directly over the main-supply line B, and wash-basin $W^2$, in adjoining room.

Now, reverting to Fig. 1, I will first explain the operation of the accumulator with its self-regulating triangular-shaped current-regulator B' D C. Supposing now that water be drawn at E, the water from the main supply enters at B, raises check-valve $B^2$, and follows curved connection C to E. Now, if E be suddenly closed, the motion of the entire body of water in supply B from its source or top would be suddenly checked and cause a sudden concussion in the pipes, were it not for the direct connection B', where the water will naturally fly for relief on account of its being in a straight and continuous course with that of the main supply, drive open check-valve $B^3$, and enter, by way of stop-cock $B^4$, air-chamber A, which was previously filled by air through check-valve $A^2$, which air will now be compressed and offer a gradual resistance to the moving column of water through B, thereby preventing its sudden check; yet in practice it will be found that the momentum of water during this gradual checking process will by far for a certain short period exceed the natural standing pressure; therefore every time the water is closed suddenly at E the chamber A will be charged with a pressure exceeding that of its natural or ordinary supply, and the same retained in A by check $B^3$, directly over the main supply-pipe B, will force water from E to a greater height for use in upper floors. If, after the accumulator and its pipes are all charged, as hereinbefore stated, and as shown in Fig. 1, water be drawn by valve V', Fig. 2, in the closet W, the supply-current will start first from chamber A with great force, by way of A' $B^4$, curve D, connection E, curve V, valve V', and connection $V^2$, into closet W. The current, now being so swift through $B^4$ D E, Fig. 1, and greater in pressure than the supply at B, owing to its previous accumulations by momentums, will draw the valve $B^2$ open and start the main B, also to supply closet W by way of B $B^2$ C E, there thus being two supplies flowing into the closet with an initial pressure greater than the normal pressure of the supply-works.

Should the water be shut off from the supply B, by reason of its being used or drawn upon below this point, the swift current in A' B⁴ D E, Fig. 1, will actually form a siphon and draw water up B until the pressure in A becomes gradually exhausted, when the check-valve B² will close and the supply continue from A alone.

When the supply from A is so heavily drawn upon that the compressed air in A has become equal to that of the atmosphere, the check-valve A² on top opens inwardly and admits air, so that all the water may be drawn off from A, and the chamber replenished with fresh air. Now, when water is drawn at some distance from the outlet E of the triangular apparatus B' D C, above referred to, the momentum of that body of water will also cause a jar, if no proper provision be made to gradually check it. Suppose that water be drawn at a faucet, E², of a wash-basin, W², Fig. 2, and the same be suddenly closed, all the water between E, E', and E² would be suddenly checked were it not for curved pipe E³, check-valve E⁴, and curved pipe E⁵, admitting the charge produced by momentum into the auxiliary pipe S, through which the charge is received into the air portion of chamber A at S².

Fig. 2 shows the supply-pipe E and auxiliary pipe S laid side by side under the floor near basin W², so as to connect in a similar manner other points of connection.

By having a resisting-spring on the check-valve E⁴ equal to one or two pounds per square inch greater than the standing pressure of the supply the same arrangement can be applied to the hot-water pipes of basins and bath, and the charge-pipe similar to E³ E⁴ E⁵, connected with auxiliary pipe S, without the necessity of a special hot-water auxiliary and air-chamber. The run-around pipe C', Fig. 1, is for the purpose of emptying the pipes when desired, and for that purpose the cock C⁴ is opened. The same pipe, with check-valve C² and cock C³, is for the purpose of admitting air whenever water is drawn on the lower floors, or at a point below B, thereby allowing the column of water in the pipe to fall, drawing in air through check-valve C² by way of regulating-cock C³. When the column of water again rises, by the faucets below being closed, it drives the admitted air before it through check B²; pipe B', check B³, and into the accumulator for replenishment, at the same time neutralizing the shock which would otherwise have been produced by the sudden closing of faucets below.

Having now explained my invention, what I claim, and desire to secure by Letters Patent, is—

1. In combination with a water-supply pipe, B, a three-way triangular and curved-shaped apparatus, B' D C, provided with two check-valves, B² B³, and arranged with three nozzles to connect, respectively, with the supply B, accumulator A, and outlet E, substantially as and for the purpose described.

2. In combination with a triangular apparatus, B' D C, provided with check-valves B² B³, and an accumulator, A, provided with check-valve A², a pipe, C', arranged with check-valve C², and stop-cocks C³ and C⁴, substantially as and for the purpose herein set forth.

3. In combination with a supply-pipe, B, its triangular apparatus B' D C, provided with check-valves B² B³, and an accumulator, A, also main auxiliary pipe S, curved branches E³ and E⁵ with check-valve E⁴, substantially as and for the purpose herein stated.

ARTHUR J. L. LORETZ.

Witnesses:
ARTHUR LORETZ, Jr.,
WALTER NICHOLS.